Oct. 14, 1952     G. W. BORKLAND     2,613,397

MANUFACTURE OF MOLDED ARTICLES

Filed May 29, 1946

INVENTOR.
GUSTAVE W. BORKLAND
BY
Staelin & Overman
ATTORNEYS

Patented Oct. 14, 1952

2,613,397

UNITED STATES PATENT OFFICE 2,613,397

MANUFACTURE OF MOLDED ARTICLES

Gustave W. Borkland, Marion, Ind., assignor to Owens-Corning Fiberglas Corporation, a corporation of Delaware Application May 29, 1946, Serial No. 672,954

3 Claims. (Cl. 18—55)

This invention relates to the art of plastic molding and particularly to the molding or laminating of thermosetting resinous materials reinforced or filled with fibers including the various forms of glass fibers, which are known to impart many desirable physical, chemical and electrical properties to the molding or laminated articles.

It is well understood by those skilled in the plastic art that, although the flow of the molding compound is substantially reduced by the incorporation of fibrous or fabric materials as a reinforcement or filler for the resin, the resulting strength of the molded item is thereby greatly increased. Other factors being equal, the increase in the strength of the molded item is proportional to the strength of the individual fibers. As a result, for large structural parts, it is expedient to reinforce or fill the resinous materials with glass fibers, which are known to possess outstanding strength characteristics. In addition, glass filler being substantially inert, is instrumental in increasing the moisture resistance, chemical resistance, heat resistance and electrical resistance of the plastic molded articles.

The characteristics of the glass fibers individually or in a composite molded mass are a determining factor in its applications as a reinforcement or filler for resinous materials. The low specific gravity favors its use in large moldings. The low water absorption influences the dimensional stability of the molded article. The high tensile strength, flexural strength, flexural moduli, and the excellent impact strength places the material high among those suitable as a strengthening agent or filler in plastics. Strength is an important, if not controlling, factor in the manufacture and use of large structural parts, such for example, as airplane fuselages, wings, and tails, automobile doors, panels and fenders, one piece or sectional boat hulls, and even home furniture, wallboards, doors, or the like. In these applications, the advantages of glass fiber reinforcement for resins have already been proven, and their uses in other large structural or even decorative parts are being continuously expanded. Another application utilizing the heat resistance and strength of the reinforcing glass fibers includes bread pans and baking forms. Other factors later to be discussed, such as the directional alignment of the fibers and the resins comprising the binder, influence the ultimate strength of the molded article. The former can be easily controlled during the "laying in" process and the latter is as yet in active stages of development.

Practically and economically, the forming of large structural moldings or laminates is presently limited to the low pressure molding process. High pressure molding methods in the range of 2,000 to 10,000 pounds pressure per square inch of molding surface, require the use of highly polished tool steel dies, the initial cost of which is, as a practical matter, prohibitive. In addition, the designs of airplanes, automobiles and boat hulls are frequently modified so that new dies necessarily must be constructed, thereby further increasing the die cost per molded item.

In addition, molding equipment, such as presses capable of producing the total pressure required throughout the area of the die, would be tremendously awkward, and an expensive item, which could not readily be acquired nor operated by the ordinary plastic fabricator. In contrast, however, low pressure molding and laminating methods, ranging from mere contact pressures of ¼ pound per square inch of molding surface to 250 pounds per square inch, enable the use of low cost and easily formable dies, which are required merely to withstand the low pressures. Such dies, for example, may be manufactured or formed from wood, plaster-of-Paris, various cast metals, paper forms or the like. It is obvious that the size of the die is, therefore, unlimited and easily formable or reformable, such that changes in design can be readily made, or new molds cheaply manufactured. It is also apparent that multiple molds may be manufactured without considerable cost, enabling the rate of production to be greatly increased over that ordinarily obtained with a single expensive high pressure mold.

Pressure generating systems for use with low pressure molding processes are readily available to all fabricators, such that low pressure molding may be adapted to any plastics plant or process.

Some difficulties are encountered in the fabrication of large moldings or laminates by the low pressure process. The low cost molds manufactured from wood, plaster-of-Paris, cast metals, sheet metals or paper forms are comparatively rough or uneven on their surface and the roughness is directly transferred to the adjacent surfaces of the molded articles. Obviously, such parts adapted for use on airplanes, vehicles or the like, reduce the aerodynamic efficiency, handicapping their use in such applications. Low pressure moldings processed by the flexible blanket method, later to be described, are also uneven and rough on the surface adjacent the rubber-like blanket.

Further, the removal of large moldings from the mold is made substantially more difficult as the size of the structure is increased. Parting compounds, such as films of regenerated cellulose, polyvinyl alcohol or water soluble hydroxyethyl cellulose applied to the surfaces of the mold dies, have aided removal from the mold, but not infrequently, even with their use, breakage, cracking or the like has occurred during their removal. In addition, the draft of the mold greatly influences the removability of the molded item. In many cases, large dome-like structures are found to be almost impossible to eject without damage to the molded article.

With the above in view, it is an object of the invention to produce a new and improved molding method particularly adapted to the formation of large items by relatively low pressure methods in such manner that roughness or irregularities in the mold surface are not transferred to the molded article.

Another object is to produce a molding or laminating process of the type described, utilizing a thermoplastic sheet, which is interposed between the adjacent surfaces of the mold, the rubber-like blanket and the molding compound, and at increased pressures and at the elevated molding temperature, is rendered sufficiently plastic to conform to the contour of the dies, but militates against the transposition of the irregularities of the mold and blanket surfaces to the surfaces of the molded article, thereby to produce a smoothly finished molded article conforming to the contour of the forming dies.

A further object is to provide a molding process in which a preform of thermoplastic resinous material is interposed between the surfaces of the rubber blanket, dies and the molding compound to obviate the roughness of the mold or blanket surfaces, the thermoplastic resins being incompatible with the monomeric or polymeric resins comprising the binder of the molding compound, such that the preform may subsequently be stripped from the article to expose a smoothly finished surface on the molded article.

A still further object is to interpose a substantially thick film of thermoplastic resin between the surfaces of the mold and the molding compound, the resin having such characteristics that it is rendered sufficiently fluid or plastic at the elevated molding temperatures, that it readily parts on the application of removal forces, enabling the cured structure to be ejected without detriment to the molded item, the covering or caul being subsequently removable to expose a unitary smoothly molded article.

A still further object is a new and improved liner for plastic working molds which is adapted effectively to cover irregularities on the mold surfaces, thereby to produce a smooth surfaced molded article A still further object is a discardable liner for low pressure molds, which may be disposed between the irregular mold surfaces and the material to be molded, and which is rendered plastic at the elevated molding temperatures to conform to the contour of the dies and yet militate against the transfer of the mold surface irregularities to the surfaces of the molded article.

Other objects and advantages of this improved molding process will become evident from the following description and claims, and for purposes of illustration only, an embodiment of the invention is shown in the accompanying drawings, in which:

Figure 1:
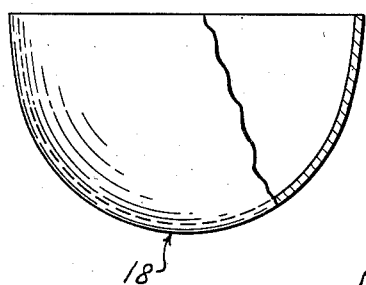
Figure 1 is an elevational view partially in section of a dome-like structure molded by the improved low pressure molding process.

When a thermosetting molding compound or laminate is subjected to heat and pressure, it first becomes soft and plastic enabling the compound to flow sufficiently to conform to the mold contour, after which it is soon converted to the insoluble and infusible "C" stage or set enabling the article to be removed from the mold while still hot without deformation or flow. On the other hand, a thermoplastic resinous compound that is not molded remains plastic until cooled. Thus, an article may be molded from a thermosetting compound merely by placing the composition in a hot mold until cured and then it may be removed while hot. The molding of a thermoplastic is more complex because the material must be heated up to the plastic softening temperature and then subsequently cooled down to the temperature of set.

In the low pressure molding of large structural items, the low cost molds are not particularly adapted for good heat transfer. As a result, the necessity for heating and cooling unduly prolongs the molding of items having thermoplastic resins as binder. It is, therefore, expedient to use thermosetting resins in the low pressure molding processes.

Suitable thermosetting resins are to be found in two distinct groups catagorized by their chemical reaction, namely, the thermosetting condensation type resins in which the cure is accompanied by an evolution of vapors or gases, and the polymerization type resins in which no volatiles are evolved, the entire liquid mass being converted to a void free solid. In the former group of condensation products are such commonly used resinous materials as the phenolics, ureas, melamines, and resourcinols, which react with aldehydes or the like. The polymerization type adhesives include such resinous materials as the allyl alcohols and their derivatives, polystyrenes, and the polyesters and combinations or co-polymers of the above. One resin combination in the latter group which has been found to be particularly suited to the low pressure molding of plastics reinforced or filled with glass fibers is well-known in the trade and marketed under the name of "Selectron" which include the addition type copolymers formed of the unsaturated allyl compounds and their esters and which include the unsaturated polyesters of the type formed by the reaction of saturated or unsaturated polycarboxylic acids with saturated or unsaturated polyhydric alcohols and which are manufactured by the Columbia Chemical Division of the Pittsburgh Plate Glass Company.

In carrying out this invention, a resinous liner is selected, which may be rendered sufficiently plastic at the molding temperatures, such that the face of the liner intimately engaging the surfaces of the mold or blanket will contain the irregularities, and is sufficiently thick and resilient to confine such irregularities within itself and present on its opposite face, a smooth contoured surface which is transferred to the surface of the molding compound bearing thereagainst.

The composition of the interliner is one of those materials which are incompatible with the resinous binder whether that binder be in monomeric form or completely cured, for it is a desideratum that the adhesion between surfaces of the liner and the cured molded article be such that the liners ultimately may be readily stripped from the surfaces of the molded article. Resinous sheet materials such as the cellulose esters including the cellulose acetates, cellulose butyrates or cellulose propionates; the cellulose ethers including ethyl cellulose, benzyl cellulose, methyl cellulose, and nitrocellulose; regenerated cellulose marketed under the name of cellophane; or the water soluble polyvinyl alcohols are known to be sufficiently incompatible with both the condensation type and the polymeric type binders and, therefore, are suitable as liners. For example, cellulose acetate is successfully used as an interliner for glass fiber filled molding compound having the Selectron resins as binder.

Other resilient sheet materials or thermoplastic resinous compounds may be used as liners. However, it is expedient first to determine the compatibility or adhesion between the binder resin and the liner resin in any combination. For this purpose a simple test may be used in which a sheet of the proposed resinous liner is disposed upon a plate of the resinous material comprising the binder. After the application of heat and pressure, the force necessary to strip the sheet from the plate is easily measured. In many instances, thermoplastic resins which are incompatible with one type of resin may not be incompatible with another as to render it unsuitable for use as a liner therewith. Other thermoplastic sheet materials which are suitable as liner with the condensation type resinous binders are the acrylates, polystyrenes, polyamides, and the vinyl chloride and acetal resins.

Figure 3:
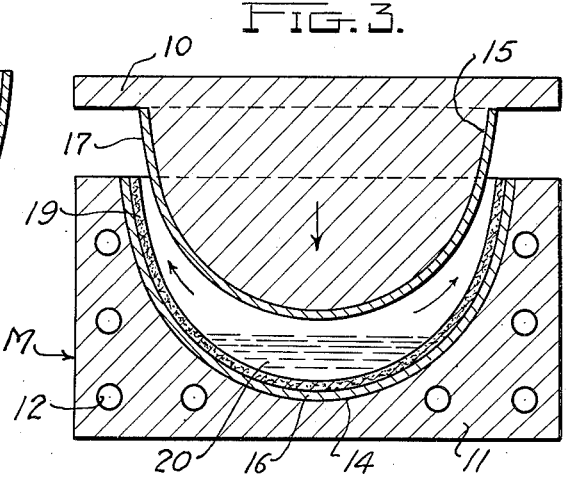
Figure 3 is a view similar to that of Figure 2, but illustrating another means for distributing the combining resin among the preformed mass of glass fibers or fillers, the preformed liners being disposed between the mold surfaces and the molding compound.
Figure 2:
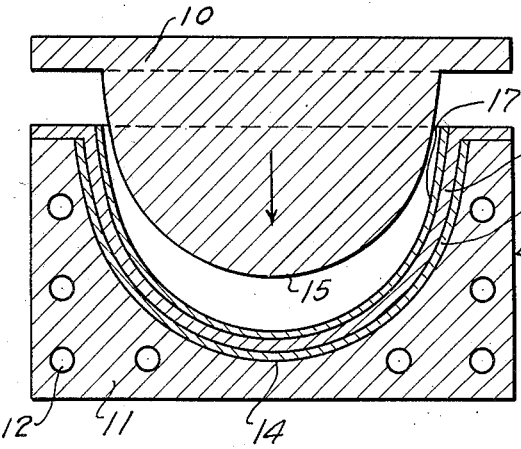
Figure 2 is a vertical sectional view of a cast metallic plug and mold cavity having preformed liners disposed between the mold surfaces and the material to be molded.

Referring now to the drawings, Figures 2 and 3 illustrate a simple compression type mold M, comprising a plug 10 and a cavity 11 which in this instance, is conveniently formed from cast metals, such as aluminum, and is cored at 12 for the passage of water or steam for heating and cooling purposes. It is to be understood that the plug and cavity may be formed from other rigid and formable materials such as those previously described.

Ordinarily, before the plug enters the cavity, the molding compound is deposited within the latter. However, when the molding compound comprises fibrous materials or fabrics as fillers, the composition has poor flow characteristics, requiring high pressures for forcing the material to fill the space between the complementary members. In such instances, it is necessary to position the molding compound in the cavity either by preforming the mass to conform generally to the mold contour, or else by "laying in" the material as will hereinafter be described.

In Figure 2, a preformed mass 13 comprises a mat of fibrous materials coated or substantially filled with the resinous material comprising the binder. In the manufacture of glass fiber reinforced or filled laminates, the glass fabric may be precoated with the resinous binder by the generally used dip and baking process, after which strips of the fabric are disposed in the cavity, the number of layers of fabric determining the thickness of the molded article as well as the strength.

The maximum strength of the laminate in the transverse or longitudinal direction may selectively be determined by the directional disposition of the glass strands. The use of a unidirection glass fabric disposed such that all of the glass strands lie in one direction, will yield maximum strength in that one direction, an all-over glass fabric having strands disposed in both directions will yield maximum strength in both directions, and the angular disposition of one layer in relation to the others adjacent will result in a laminate having substantially uniform strength characteristics in all planar directions.

As previously pointed out, the surfaces 14 and 15 of the cavity and plug respectively being of untreated cast metal, are not smooth and for purposes of militating against the transfer of the mold surface irregularities to the surfaces of the molded article, liners 16 and 17 comprising pliable materials, are interposed between the mold surfaces and the material to be molded. At the elevated molding temperature, the liner, which advantageously may be formed from thermoplastic resin, is rendered sufficiently plastic to conform to the contour of the plug and cavity, taking the imprint of the irregular surfaces, yet being of sufficient thickness and resiliency to militate against the transfer of the surface imprint to the opposite face of the liner. Thus, the liner effectively eliminates the effect of irregularities on the mold surfaces and yet, under pressure, conforms to the contour of the mold to transpose the desired contour to the molding compound.

Figure 5:
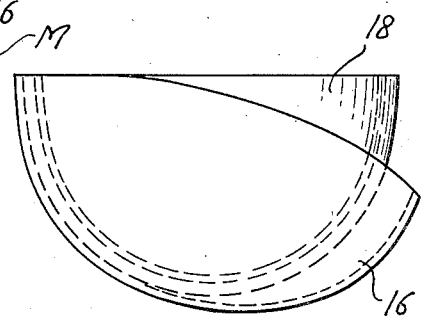
Figure 5 is an elevational view of a mold form from which the protective liners are being stripped.

When the binder resin of the molding compound has been sufficiently advanced, the mold dies may be parted while hot and the cured or partially cured molded article 18 removed with the covering or liners of thermoplastic resin still adhered thereto, as illustrated in Figure 5. If the molded article has been ejected before the resins have been completely converted to the insoluble and infusible stage, additional baking may be required. While the mass is being cooled, the thermoplastic liners 16 and 17 are stripped or removed from the molded article 18, the surfaces of which are substantially smooth. Ordinarily, the used liner may be discarded. However, if proper equipment is available for purposes of reclamation, the thermoplastic resin may be reformed into a sheet or preform for subsequent reuse as a liner.

It is of importance that the liner material be completely incompatible with the resinous materials comprising the binder for the fibrous fillers. Otherwise, removal therefrom will be rendered more difficult and, in some instances, impossible. Generally, most of the presently marketed thermoplastic sheeted resins are incompatible with cured thermosetting resins, especially those of the condensation type, including the phenolic, urea, melamine, furfuralphenol and resorcinol reaction products with formaldehyde or other aldehydes. In addition, the cellulosic esters and ethers are substantially incompatible with the thermosetting condensation products and the thermosetting polymerization resins, such as the allyl derivatives, polystyrenes, and the polyesters and co-polymers of combinations of the above. Incompatibility of the monomeric or uncured resins with the thermoplastic liners is a desideratum; otherwise one will become ingrained in the other, or fused with the other such as to render subsequent separation substantially more difficult, and possibly modifying the surface characteristics of the molded article 18.

In carrying out the spirit of this invention, I make use of a thermoplastic sheet having a thickness sufficient to receive the roughness imprinted on one face without effecting the finish on the opposite face. I find a sheet thickness of .003 to .125 inch ordinarily sufficient. However, more thickness may be used where the surface irregularities are still transmitted through the liner.

Where the contour of the cavity or mold form is substantially flat or slightly curved, flat sheets of thermoplastic resins may be positioned in the cavity or over the mold. However, where contoured articles are to be manufactured, such as the dome illustrated, it is expedient to preform the thermoplastic sheet substantially to conform to the contour of the mold or cavity. This may be readily performed by the use of an auxiliary press having low cost forming dies, or the preforming operation may be accomplished in the mold M subsequently to be used in the fabrication of the molded item.

In the fabrication of a molded dome in the plug 10 and cavity 11, as illustrated in Figures 2 and 3, the mold members are constantly maintained at the elevated molding temperature. A preformed liner 16 is positioned in the cavity while the plug 10 is spaced from the cavity 11 permitting sufficient "daylight" therebetween. Subsequently a preform 13 comprising a mass of discontinuous glass fibers in random arrangement and coated with suitable thermosetting resins, is positioned over the liner 16, and another thermoplastic liner 17 is superposed thereon. Curing and forming commences when the plug is lowered into the cavity and into engagement with the surface of the liner 17. Heat transmitted to the resinous compounds from the mold dies causes the thermoplastic resins to become plastic and the thermosetting binding resins first become plastic and then pass shortly on curing to the rigid insoluble and infusible stage. During the interval when all materials are plastic, the pressure developed between the mold surfaces causes the materials to flow sufficiently to conform to the contour of the mold, the liner also taking the surface imprint of the mold surfaces, but not transmitting them to the surfaces of the molding compound. When the cure of the thermosetting binder has been sufficiently advanced to the infusible stage, the plug and cavity are parted, and the molded article 18 with the liners 16 and 17 still disposed thereabout are removed from the cavity, which is then prepard for the next cycle of operation. While outside of the mold, the combination may be exposed to an additional baking operation further to advance the cure of the binder resins, or else the liners or coverings may be stripped from the molded article 18, as illustrated in Figure 5.

Sometimes, difficulty is encountered in ejecting or removing the molded article and the liners from the mold cavity. In such instances, a stripping compound or sheet may be used between the liners 16 and 17 and the mold surfaces 14 and 15. Suitable stripping compounds have been found to include thin sheets of regenerated cellulose or polyvinyl alcohol, or a thin film of water soluble polyvinyl alcohol or hydroxy ethyl cellulose, the latter being washable from the mold prior to its subsequent use.

Another method of fabricating a void free molding with the plug 10 and the cavity 11 consists in positioning a preformed liner 16 in the cavity, and thereafter "laying in" a preform or distributing a mass of discontinuous glass fibers 19 directly into the cavity 11, or else draping sheets of glass fabric in the cavity until the desired number of plies have been built up. A pool 20 of liquid resin deposited in the cavity is subsequently forced upwardly and between the interstices of the matted fibers by the entering plug 10, which is lined with a preformed liner 17. The upward flow of the liquid resin effectively emits substantially all of the occluded air between the fibers, such that a void-free molded article 18 results when sufficiently cured by the heat and pressure. It is manifest that this latter method is particularly adapted to molding processes using the nonvolation polymeric type resins such as Selectron previously described.

Figure 4:
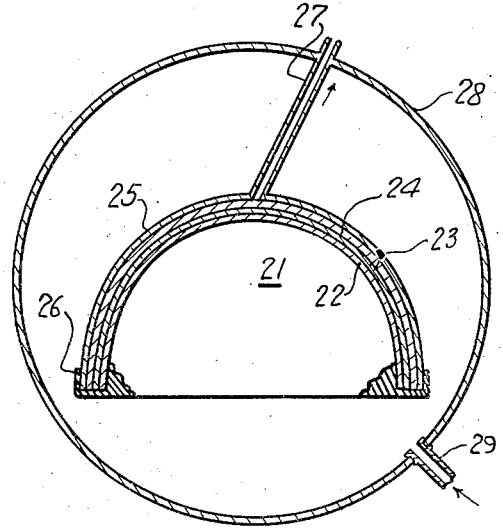
Figure 4 is a sectional view of mold parts utilizing the blanket process and employing liners or preforms.

Another method of low pressure molding commonly referred to as the hat-press or blanket molding is illustrated in Figure 4, and since it is well-known to those skilled in the art, detailed description thereof is considered unnecessary. Suffice it to say that it consists of providing a mold form 21, which may be comprised of any low cost rigid material such as cast metals, wood, sheet metal, plaster-of-Paris, or paper form or the like. Over this form, a sheet liner 22 of thermoplastic resins is deposited. The sheet may be substantially flat as received, or preformed to the general contour of the form 21. Over the liner 22 is deposited a preform of glass fibers 23 or other fibrous materials impregnated with suitable thermosetting resins. The blanket method of molding on an open form 21 is particularly adapted for the fabrication of laminates incorporating fabrics as the reinforcement or filler. The method of "laying in" in such instances resides in the placement of a sheet of the fabric over the lined mold form and then brushing on a film of liquid resin binder. If a solvent solution is used, a space of time is required for the evaporation of the solvent before subsequent plies may similarly be placed thereon. However, if the polymerization liquid type resinous binders are used, the adjacent ply of fabric may be immediately positioned and smoothed thereon whereafter other plies and films are deposited until the desired number of layers have been built up. It is possible in this method of "laying in" to arrange the fabrics as desired, to yield a unidirectional distribution of strands, or an angular disbursement which yields high strengths in all planar directions, as previously described.

When the predetermined number of resin coated plies has been deposited, it is covered with another preformed liner 24 of thermoplastic resin or the like. Thereafter, a flexible rubber-like member or blanket 25 is placed over the built-up mold form, the free ends of which are sealed to the mold form by means of an enclosing shoulder 26 or by other adhesive means. Thus when the air is exhausted from the under side of the flexible member through a tube 27 forming a part of the blanket, the flexible member intimately engages the upper surface of the liner 24. This composite structure then is positioned in an autoclave 28 where steam or other heating means is admitted through a tube 29. The pressure within the autoclave is built up by steam or other fluid means which forces the blanket and mold elements into more intimate contact. The effect of the heat in the autoclave operates first to soften the plastic resins and the pressures concomitantly effecting the flow of the composite materials substantially to conform to the contour of the mold form. After the resinous binder has been sufficiently advanced to the rigid and infusible stage, the autoclave is opened and the composite structure removed. The molded article is removed from between the mold form and the flexible member with the liners 22 and 24 attached thereto. It is evident that the rubberlike blanket will also have sufficiently rough surfaces to impair the surface of the molded article, justifying the use of a liner between the blanket and the surface of the molded article.

As previously pointed out, ejection of the molded article is often difficult even when a parting compound is used. Under such circumstances, it is advantageous to provide a thermoplastic liner, which is substantially fluid or plastic at the elevated molding temperature. Thus the liner material itself may part in response to the ejectment forces enabling the molded article to be removed without detriment to itself. A film comprising part of the thermoplastic liner temporarily adheres to the surfaces of the molded article and may be subsequently removed. Manifestly a film of the same liner material will remain on the mold surfaces which must be cooled down sufficiently to reduce the adhesion between adjacent surfaces enabling the thermoplastic resinous material to be removed therefrom.

Thus the liner may also operate as a parting compound in those applications in which removal by the standard methods are impossible or harmful. It is to be understood that the thermoplastic resinous liner necessarily must be incompatible with the resinous material comprising the molding compound. Otherwise subsequent separation would be rendered more difficult or impossible.

For parting purposes, thermoplastic resins may be used with added lubricants or plasticizers such that the cohesive strength between molecules and the softening temperature of the resin will be substantially reduced. Use of lower molecular weight resinous compositions which are known to soften or melt at relatively lower temperatures than the corresponding substances of higher molecular weights, may advantageously be used as a parting compound.

The term "flexible" has herein been applied to the liners to indicate their lack of brittleness and rigidity of an extent preventing their being twisted, bent or otherwise deformed slightly. The liners are, however, form-retaining, that is, when shaped in suitable fashion, as under heat and pressure, to the desired contour they will retain the shape imparted to them. This greatly facilitates placing the liners smoothly in the mold and also provides liners that may serve as temporary supports or containers for preforms of loosely assembled fibrous material after the preforms are made up and as they are transported to and placed in the mold.

Although the thermoplastic interliner has particular advantage in low pressure molding processes, it is to be understood they may be similarly used in high pressure fabricating processes wherein a highly finished mold is not used, whether glass fibers or other fibers are used as the reinforcement or filler for the resinous materials. It is also to be understood that the flexible, shaped, resinous liners may be used in combination with moldings or laminates consisting of fillers bonded together by another thermoplastic resin, which necessarily is incompatible with the flexible liner for reasons previously pointed out. In the latter instance, the molding cycle additionally includes a cooling cycle subsequent to the heating and pressure cycle for purposes of setting the thermoplastic resin.

Other changes in the details of arrangement, choice of materials and details of procedure may be effected without departing from the spirit of the invention especially as defined in the appended claims.

I claim:

1. The method of molding compositions formulated with a low pressure thermosetting resinous binder comprising the steps of positioning onto a mold surface a caul member preformed to mold shape of a rigid thermoplastic material having sufficient elasticity under the conditions of molding to deform for transferring the exact shape of the mold to the material being molded but having sufficient thickness to prevent transfer of imperfections from the mold surface, depositing the molding composition in the caul member, bringing the mold parts together to effect molding operations whereby the caul member is made to conform exactly to mold shape for transfer to the molding material without transfer of the imperfections in the mold surface, said molding operations being continued until the resinous binder is advanced to a set stage, removing the caul member with the molding material therein from between the mold parts and continuing the advancement of the molding material separate and apart from the mold parts while still being located within the caul members until the resinous binder is converted to a cured stage, and then stripping the caul member from the material molded therebetween.

2. The method of molding compositions formulated with a low pressure thermosetting resinous binder comprising the steps of positioning onto a mold part a caul member preformed to mold shape of a rigid thermoplastic material capable of elasticity under conditions of molding to deform sufficiently for transferring the exact shape of the mold to the material being molded but having sufficient thickness to prevent transfer of imperfections in the mold surface to the material being molded, loading the molding composition in the positioned caul member, positioning a second caul member of the type described over the molding composition, bringing the mold parts together to effect molding operations whereby the caul members are made to conform exactly to the shape of the mold for transfer to the material being molded without transfer of imperfections in the mold surface until the resinous binder is advanced to a set stage, removing the caul members with the molding material therebetween from between the mold surfaces, and continuing the advancement of the resinous binder separate and apart from the mold members while the caul members operate as the mold surfaces until the resinous binder is converted to a cured stage, and then separating the caul members from the material molded therebetween.

3. The method of molding compositions formulated with a thermosetting resinous binder comprising the steps of positioning onto one of the mold surfaces a caul member preformed to mold shape of a rigid thermoplastic material capable of elasticity under the conditions of molding to deform sufficiently for transferring the exact shape of the mold to the material being molded but having sufficient thickness to prevent transfer of imperfections in the surface of the mold to the material being molded, loading the molding material in the positioned caul member, covering the molded material with a second caul member of the type described preshaped to mold form, bringing the mold parts together under heat and pressure to effect molding operations whereby the caul members are deformed sufficiently to conform exactly to the mold for transfer of mold shape to the material being molded without transfer of the imperfections in the mold surface until the resinous binder has been advanced to a set stage, removing the caul members with the molding material from between the mold surfaces, and heating the assembly formed of the caul members and molding material separate and apart from the mold surfaces until the resinous binder is converted to a cured stage, and then separating the caul members from the material molded therebetween.

GUSTAVE W. BORKLAND.

REFERENCES CITED

The following references are of record in the file of this patent:

UNITED STATES PATENTS

| Number | Name | Date |
|---|---|---|
| 270,342 | Sargent | Jan. 9, 1883 |
| 553,907 | Genese | Feb. 4, 1896 |
| 1,359,919 | Reardon | Nov. 23, 1920 |
| 1,517,208 | Gillespie et al. | Nov. 25, 1924 |
| 1,665,355 | Gustafson | Apr. 10, 1928 |
| 2,190,807 | Steinberger | Feb. 20, 1940 |
| 2,201,271 | Partridge | May 21, 1940 |
| 2,223,527 | Moss | Dec. 3, 1940 |
| 2,293,914 | Nanfeldt | Aug. 25, 1942 |
| 2,305,433 | Kyle | Dec. 15, 1942 |
| 2,310,619 | Dillehay | Feb. 9, 1943 |
| 2,321,638 | Williams | June 15, 1943 |
| 2,336,578 | Skoning | Dec. 14, 1943 |
| 2,345,939 | Leary | Apr. 4, 1944 |
| 2,356,814 | Bimmerman et al. | Aug. 29, 1944 |
| 2,414,093 | Cole et al. | Jan. 14, 1947 |
| 2,495,640 | Muskat | Jan. 24, 1950 |